United States Patent [19]

Abercrombie, Jr. et al.

[11] 3,853,983

[45] Dec. 10, 1974

[54] METHOD FOR IMPROVING BRIGHTNESS OF KAOLINITE CLAYS INCLUDING IRON PYRITES

[75] Inventors: William F. Abercrombie, Jr.; Frank R. Trowbridge; Norman Lary McCook, all of Macon, Ga.

[73] Assignee: J. M. Huber Corporation, Locust, N.J.

[22] Filed: May 21, 1973

[21] Appl. No.: 362,155

[52] U.S. Cl.............. 423/113, 209/8, 209/214, 106/72, 423/151, 423/328
[51] Int. Cl............................................. C01b 33/20
[58] Field of Search........ 209/5, 8, 214, 10; 106/72, 106/288 B; 423/151, 113, 328

[56] References Cited
UNITED STATES PATENTS

| | | | |
|---|---|---|---|
| 1,199,041 | 9/1916 | Allen | 209/8 X |
| 2,030,627 | 2/1936 | Freeman | 423/151 X |
| 2,119,270 | 5/1938 | De Vecchis | 209/8 |
| 3,318,718 | 5/1967 | Beamesderfer | 106/72 X |
| 3,393,975 | 7/1968 | Mitchell | 423/113 X |
| 3,471,011 | 10/1969 | Iannicelli | 209/214 |
| 3,765,921 | 10/1973 | Duskar | 106/72 X |

FOREIGN PATENTS OR APPLICATIONS

| | | | |
|---|---|---|---|
| 148,344 | 1/1961 | U.S.S.R. | 106/72 |
| 274,889 | 4/1928 | Great Britain | 209/8 |

*Primary Examiner*—Robert Halper
*Attorney, Agent, or Firm*—Harold H. Flanders; Donald S. Lilly

[57] ABSTRACT

A method for preparing a coating grade kaolin clay from a crude clay including discoloring iron contaminants in the form of iron pyrites. The clay is roasted in an oxidizing atmosphere to convert at least a portion of the sulfurous contaminants to a form exhibiting increased magnetic susceptibility and increased solubility in chemical leachants. Thereafter the clay is formed into an aqueous slurry and subjected to a magnetic field to remove at least part of the converted components, and then subjected to conventional leaching and filtering operations.

1 Claim, No Drawings

METHOD FOR IMPROVING BRIGHTNESS OF KAOLINITE CLAYS INCLUDING IRON PYRITES

BACKGROUND OF INVENTION

This invention relates generally to the technology of coating clays, and more specifically relates to an improved process for preparing high-grade kaolin clays for coating applications.

In the commercial processing of most "normal" kaolin clays, it is common practice to remove a portion of the discoloring iron contaminants by leaching. In order, in particular to reduce discoloration caused by iron compounds, it is common to subject an aqueous slurry of the clay to a leaching and flocculating operation, pursuant to which some of the oxides of iron are converted by reduction to soluble ferrous compounds. This is most commonly accomplished by use of either zinc or sodium salts of hydrosulfurous acid as leachants, and the use of aluminum sulfate and/or sulfuric acid as flocculating agents. This procedure is normally followed by a dewatering or filtration step, dispersion, and drying.

Some kaolinitic clays, however, in addition to containing iron in a form which can be solublized by leaching, include iron in the form of iron pyrites, that is, in the form of iron sulfide. These sulfide contaminants do not become readily soluble under ordinary leaching conditions, and the leached clay therefore retains a gray, unacceptable color.

In the foregoing connection, it may be noted that it has been known for some time that magnetically attractable contaminants can, to a degree, be removed from aqueous slurries of kaolin clays by imposing on the slurry a high intensity magnetic field gradient. The forces produced upon the particles by the magnetic field gradient, effect differential movements of mineral grains through the field, in accordance with the magnetic permeability of the minerals, their size, mass, etc. Where, as discussed herein, the contaminants take the form of the iron pyrites mentioned, it has however been found that the techniques of magnetic separation may not be advantageously employed, in that the magnetic attractability of the said contaminants is unfortunately too low to yield worthwhile results.

In accordance with the foregoing, it may be regarded as an object of the present invention to provide a method for processing kaolinitic clays which contain discoloring iron-based contaminants in the form, at least partially, of iron pyrites, which results in removal of a high proportion of the contaminants, thereby yielding a high brightness clay suitable for coating applications.

It is a further object of the present invention, to provide a method for the processing of kaolinitic clays including iron contaminants in the form of iron pyrites, which by enhancing the magnetic susceptibility of the sulfide contaminants, augments the effectiveness of magnetic separation techniques, thereby yielding a high brightness clay.

It is a still further object of the present invention, to provide a method for the processing of kaolinitic clays including iron pyrites as discolorants, which so alters the said contaminants as to facilitate their removal by a combination of magnetic separation and leaching steps.

SUMMARY OF INVENTION

Now in accordance with the present invention, the foregoing objects, and others as will become apparent in the course of the ensuing specification, are achieved by use of a method which transforms the magnetically inert iron pyrite contaminants in kaolinitic clays, into materials which are both highly magnetic and much more susceptible to leachant treatment. As modified, the said contaminants will readily separate from a dispersed water-washed kaolin clay-water pulp which is subjected to a magnetic field in the presence of a collector for removal of the magnetically susceptible contaminants. In a representative procedure of the invention, the pyrite contaminated kaolinitic crude clays are heated in an oxidizing atmosphere to a temperature sufficient to oxidize the pyrites (about 400° to 600°C), but insufficient to drive off the chemically bound water from the kaolinite crystal — which latter result would unfavorably modify the rheology of the clay. Such heat treatment places the iron in a form such that subsequent leaching with zinc dithionite, or a similar reducing agent, will remove the iron as a solute. In some ores containing only minor traces of iron pyrites, an acceptable product may be obtained by leaching only. In the bulk of cases, however, this is economically impractical due to the inordinately large amounts of leachants required to obtain commercially acceptable brightnesses. In the preferred mode of practicing the invention therefore, the roasted kaolinite, which has been subsequently slaked with water and dispersed with an appropriate dispersant, is subjected to a magnetic flux field prior to leaching.

DESCRIPTION OF PREFERRED EMBODIMENTS

EXAMPLE I

In order to provide a control illustrating the improvements obtainable in accordance with the invention, a portion of a dark gray Western Utah crude kaolin which contained an appreciable amount of iron pyrites as a discoloring contaminant, was comminuted to a fine powder in a hammermill. The ground clay was pulped in water at 40% solids with sufficient dispersant (sodium silicate) to raise the pH to around 6.4. The slurry was ground for five minutes in a Denver Attrition Scrubber using 55% by volume alumina beads (12–20 mesh) as the grinding media. The ground slurry was separated from the grinding media and fractionated by static sedimentation to produce a coating grade clay containing approximately 80% particles by weight finer than 2 microns. The coating fraction was thereupon subjected to a magnetic field intensity of 2.4 kilogauss for a retention time of 4 minutes. After magnetically processing, as indicated, the slurry was leached with 1.2 weight percent zinc dithionite and coagulated with 1.2 weight percent of aluminum sulfate. The leached slurry was dewatered by filtration, dried to contain less than 1% free moisture, and the brightness determined by standard TAPPI procedure T-646m-54. The brightnesses were also measured for the clay fraction prior to magnetic separation, and subsequent to separation but before leaching.

EXAMPLE II

A second portion of the same dark gray Western Utah crude kaolinite referred to in connection with Example I was comminuted to a fine powder in a hammermill. It was roasted at about 500°C in a shallow ceramic boat filled to a depth of 1.5 cm for 2 hours. After cooling, this sample was pulped in water at 40% solids with sufficient dispersant (sodium silicate) to raise the pH to around 6.4. This slurry was ground for 5 minutes in a Denver Attrition Scrubber, using 55% by volume alumina beads (12-20 mesh) as the grinding media. The ground slurry was then separated from the grinding media and fractionated by static sedimentation to produce a coating grade clay containing approximately 80% particles by weight finer than 2 microns. The coating fraction was subjected to a magnetic field intensity of 2.4 kilogauss for a retention time of 4 minutes. The magnetically processed slurry was leached with 1.2 weight percent of zinc dithionite and coagulated with 1.2 weight percent of aluminum sulfate. The leached slurry was dewatered by filtration, dried to contain less than 1% free moisture, and the brightness again determined by the standard TAPPI procedure T-646m-54. The brightnesses were also measured for the clay fraction prior to magnetic separation, and subsequent to separation but before leaching.

In the Table I hereinbelow set forth, comparative brightnesses are indicated for the coating clay fractions produced by the techniques of Example I and Example II, as indicated above:

TABLE I

BRIGHTNESS OF COATING CLAY FRACTIONS

|  | Without Roasting | With Roasting |
|---|---|---|
| Brightness, unleached, before magnetic separation | 58.6 | 58.7 |
| Brightness, unleached, after magnetic separation | 65.2 | 71.4 |
| Brightness, after magnetic separation and leaching | 67.0 | 85.5 |

It will be obvious from the above Table, that by utilizing the pre-roasting step, the treated clays have been vastly improved with respect to their brightness characteristics, as is evident from the bottom line of the Table. It will, of course, be equally evident from the second line of the said Table that considerable improvement results even prior to the leaching step, as clearly a considerable fraction of the previously magnetically intractable pyrites have been converted to a magnetic form of material. Similarly it will be appreciated that the said conversion has also rendered a large fraction of the said components in such form that the subsequent leaching is much more effective on the materials remaining after magnetic separation.

The precise nature of the chemical conversion achieved in accordance with the roasting step utilized in the invention, is not at the present time completely understood; although it is hypothesized that at least a portion of the original pyrite concentration is converted to magnetically susceptible oxides of iron. In carrying out the roasting operation the period of heating is usually continued until a substantial cessation is noted of the sulfurous fumes emenating from the treated material. Depending upon the retention time in the magnetic fields, fields at least as low as the 2.4 kilogauss cited in the Examples may be effectively utilized, and of course much higher intensities may be employed with at least equal efficacy. In this latter connection, reference may be had to the apparatus and methodology set forth in the copending patent applications of Joseph Iannicelli, Ser. No. 19,169, now abandoned filed Mar. 13, 1970; Ser. No. 309,839, filed Nov. 27, 1972; and Ser. No. 340,411, filed May 12, 1973, all of which applications are assigned to the assignee of the instant application. In these disclosures it is thus taught that during magnetic separation a container is utilized, adapted to have the slurry passed therethrough, the said container being filled with magnetizable elements such as steel wool. All of the cited apparatus and methodology are applicable to the present invention, in addition to the lower field intensity apparatus and methods long known in the prior art.

While the present invention has been particularly set forth in terms of specific embodiments thereof, it will be understood in view of the instant disclosure that numerous variations upon the invention are now enabled to those skilled in the art, which variations yet reside within the scope of the instant teaching. For example, while the invention has been particularly exemplified by its use in beneficiating a Western Utah kaolinite, other iron pyrite-contaminated kaolinites such as correspondingly contaminated Central Georgia kaolinites, may be similarly improved by use of the invention. Accordingly the invention is to be broadly construed and limited only by the scope and spirit of the claims now appended hereto.

We claim:

1. A method for preparing a bright coating kaolin from a crude kaolinitic clay, including discoloring iron-based contaminants in the form of iron pyrites and sulfurous contaminants, comprising:

subjecting said crude clay to comminution;

roasting said comminuted crude clay in an oxidizing atmosphere at a temperature sufficient to oxidize the pyrites but insufficient to drive off the chemically bound water from the kaolinite crystals, said temperature being from 400°C to 600°C, until a substantial cessation of sulfurous fumes is noted, to convert at least a portion of the sulfurous contaminants to a form exhibiting increased magnetic susceptability and increased solubility in chemical leachants selected from the group consisting of zinc dithionite, zinc salts of hydrosulfurous acid, sodium salts of hydrosulfurous acid and combinations thereof;

thereafter forming an aqueous slurry of said roasted clay;

subjecting at least a portion of said slurry to a magnetic field having an intensity of at least 2.4 kilogauss and high field gradients to separate at least part of said converted components; and thereafter subjecting said slurry to a leaching step employing about 1.2 weight percent leach selected from the group consisting of zinc dithionite, zinc salts of hydrosulfurous acid, sodium salts of hydrosulfurous acid and combinations thereof and to a filtration step.

* * * * *